Figure 16:
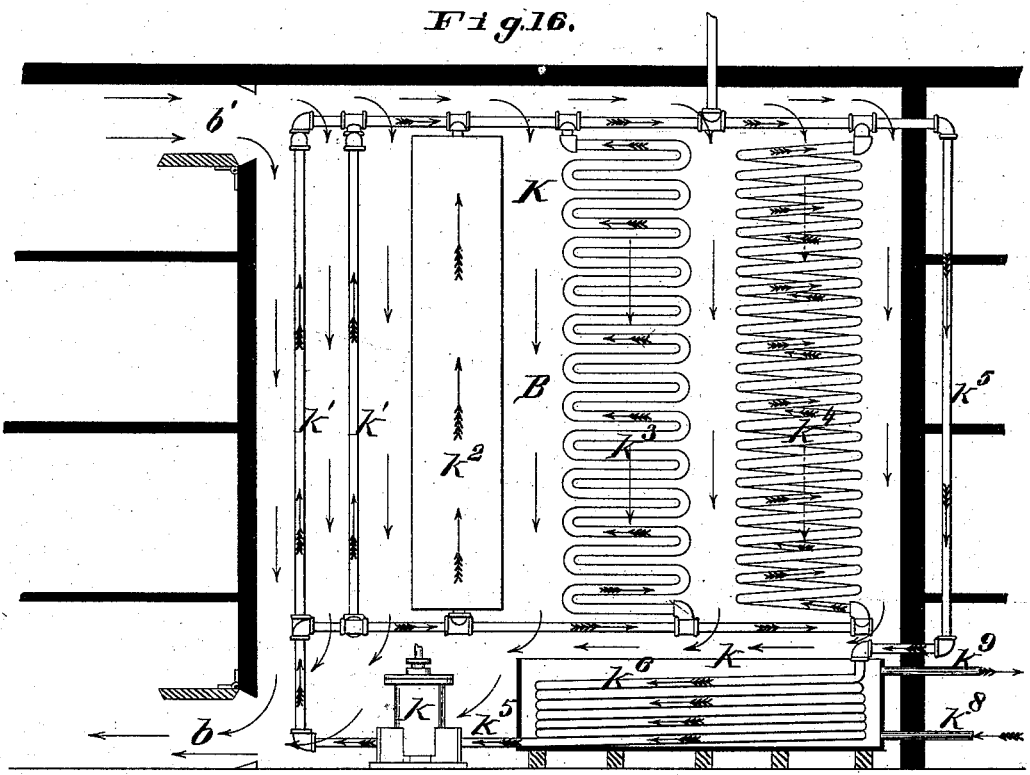

(No Model.)
DE W. C. SANFORD.
Refrigerator and Refrigerator House.
No. 239,343. Patented March 29, 1881.
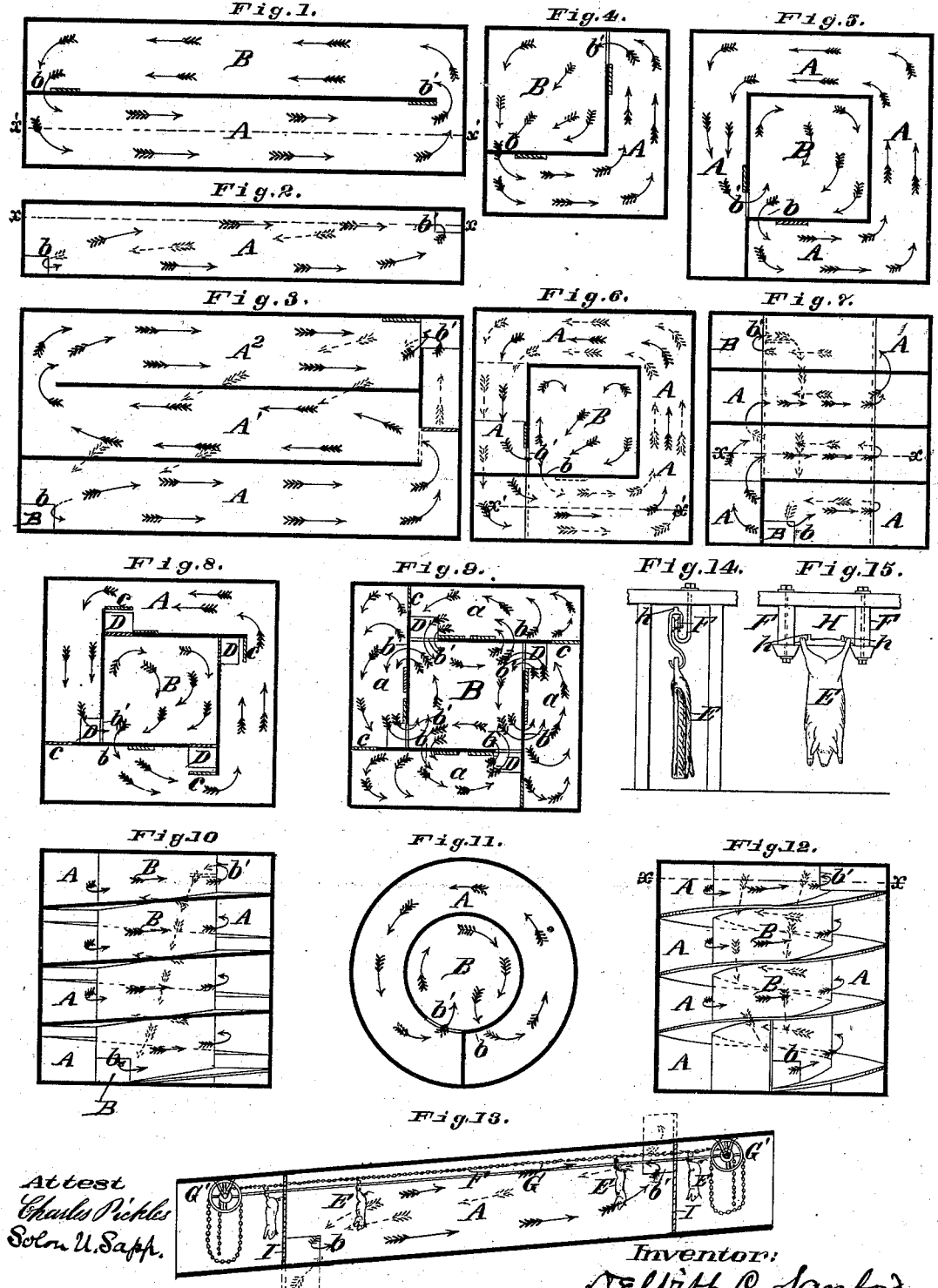
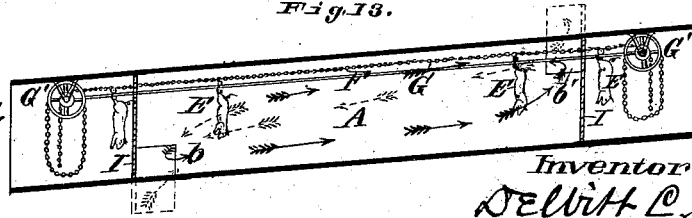

(No Model.) 2 Sheets—Sheet 2.

DE W. C. SANFORD.
Refrigerator and Refrigerator House.

No. 239,343. Patented March 29, 1881.

Attest:
Charles Pickles
Solon U. Sapp.

Inventor:
DeWitt C. Sanford.
by C. D. Moody,
atty.

UNITED STATES PATENT OFFICE.

DE WITT C. SANFORD, OF ST. LOUIS, MISSOURI.

REFRIGERATOR AND REFRIGERATOR-HOUSE.

SPECIFICATION forming part of Letters Patent No. 239,343, dated March 29, 1881.

Application filed July 27, 1880. (No model.)

*To all whom it may concern:*

Be it known that I, DE WITT C. SANFORD, of St. Louis, Missouri, have made a new and useful Improvement in Refrigerators and Refrigerating-Houses, of which the following is a full, clear, and act description, reference being had to the annexed drawings, making part of this specification, in which—

Figure 1 is a horizontal section taken on the line $x$ $x$ of Fig. 2; Fig. 2, a vertical section taken on the line $x'$ $x'$ of Fig. 1; Fig. 3, a vertical section of a refrigerating-house having the present improvement, and showing a vertical series of refrigerating compartments; Fig. 4, a horizontal section, showing a modification in the relative arrangement of the air-cooling chamber and refrigerating-compartments; Fig. 5, a horizontal section, showing a further modification in the relative arrangement of the air-cooling chamber and the refrigerating-compartments; Fig. 6, a horizontal section taken on the line $x$ $x$ of Fig. 7; Fig. 7, a vertical section taken on the line $x'$ $x'$ of Fig. 6; Figs. 8 and 9, horizontal sections similar to that of Fig. 6, but showing doors for dividing the refrigerating-compartment into sections and flues for returning the air from the sections into the upper part of the air-cooling chamber; Fig. 10, a vertical section of a square building, showing the refrigerating-apartment winding spirally around the air-cooling chamber; Fig. 11, a horizontal section taken on the line $x$ $x$ of Fig. 12. Fig. 12, a vertical section, showing a circular building, and the refrigerating-apartment winding spirally around the air-cooling chamber; Fig. 13, a vertical section taken through a refrigerating-apartment—say a portion of the apartment shown in Fig. 12—and showing means for moving the articles to be refrigerated along the refrigerating-apartment in a direction contrary to that of the refrigerating air-current; Figs. 14 and 15, details, showing means for supporting the articles and moving them along the refrigerating apartment; and Fig. 16, a vertical section taken through an air-cooling chamber, and showing an apparatus for cooling the air therein.

The same letters denote the same parts.

The present invention is one of a series of improvements in refrigerators and refrigerating-houses, having an air-cooling chamber and one or more refrigerating-apartments.

The principal feature of the present improvement is extending the refrigerating apartment or apartments alongside the air-cooling chamber, or so as to partly or wholly surround the air-cooling chamber. It also relates to the mode of cooling the air in the air-cooling chamber, and to the manner of presenting the articles to be refrigerated to the refrigerating air-current.

In the annexed drawings, A, Figs. 1 and 2, represents the refrigerating-apartment, and B the air-cooling chamber. The air flows from the chamber B, through the outlet $b$, into the apartment A. It then traverses the apartment A and re-enters the chamber B through the inlet $b'$, and so on around and round, as indicated by the arrows.

In place of a single apartment A, there may be a vertical series, A A' A², of any desired number of refrigerating compartments, as shown in Fig. 3, and through which the air flows, as indicated.

In place of extending the refrigerating-apartment along one side only of the air-cooling chamber, the apartment may extend around two or more sides of the chamber, as shown in Fig. 4, or it may entirely surround the air-cooling chamber, as shown in Fig. 5. In the last two named cases the outlet from the air-cooling chamber is at $b$, and the inlet to the chamber at $b'$, and the air-circulation is as indicated by the arrows.

In place of having the refrigerating-apartment but one story high, as in Figs. 4 and 5, it may be several stories high, as shown in Figs. 6 and 7, and in such case the air, after passing through one story and encircling the air-cooling chamber, rises into the second story and around through it, and thence into and through the third story, finally entering the chamber B at $b'$. In the last-described form the various stories constitute a continuous refrigerating-apartment.

In Figs. 8 and 9 is shown an air-cooling chamber surrounded by a refrigerating-apartment, but having partitions, doors, and flues, so that the air may circulate around in any given story without passing up into an upper story, or so that it may rise into an upper story, as desired, and also so that any given story may be divided (by vertical transverse partitions or doors) into sections, having independent connections with the air-cooling chamber, and in consequence an independent air-circulation, and as indicated by the arrows in Fig. 9. The doors $c$ $c$, Figs. 8 and 9, enable any story to be subdivided into the sections $a$ $a$ $a$ $a$, as in Fig. 9, and in such case the air flows from the air-cooling chamber at $b$, and re-enters it at $b'$. The doors $c$ $c$ are also used when it is desired to direct the air into an upper story, in which the door that is just beyond the point at which the air is to be directed upward is closed. The air then ascends through the flue D to the top of the air-cooling chamber. Any desirable number of flues D D D D may be employed, and they may have suitable valves for closing them, when desired. In Figs. 10, 11, 12 the refrigerating-compartment winds spirally around the air-cooling chamber B. The air leaves the chamber at $b$, winds around and round the chamber B, as indicated by the arrows, and finally re-enters the air-cooling chamber at $b'$. In all these cases the refrigerating-air is coldest nearest to the doorway or outlet, through which it comes from the air-cooling chamber into the refrigerating-apartment, and as it travels therefrom it rises in temperature. Therefore it is best that warm articles to be refrigerated should enter the refrigerating apartment at some distance from the cold-air-supply opening, and be moved against the current toward the cold-air supply as they cool, and be withdrawn from the refrigerating-apartment at the coldest end thereof. For this purpose necessary openings, fixtures, and apparatus are provided, as indicated in Fig. 13. The air enters the refrigerating-apartment A at $b$, and moves longitudinally through the apartment, as indicated by the arrows, leaving the apartment at $b'$.

The articles E to be chilled are introduced into the apartment at or near the opening $b'$, and during the chilling operation are moved toward the opening $b$, and the best results are obtained when the temperature of the refrigerating-apartment at the various points in its length by which the articles are passed, corresponds, or nearly corresponds, to that of the articles as they are moved along past the points in question.

Ways, slides, or rails F may be used for moving the articles upon, and a chain, G, and tackle G' may be used for moving the articles. The latter may be connected with the chain in any suitable manner—for instance, the gambrel H may have points $h$ $h$, which engage in the chain G. Any other suitable means may be employed for moving the articles in the manner described.

I I, Fig. 13, represent doors at the ends of the apartment A. The latter may be inclined, as shown, or horizontal, as desired. The opening $b$ may be from beneath the apartment, and the opening $b'$ above it, as indicated by the dotted lines in Fig. 13.

K, Fig. 16, represents an apparatus for cooling the air in the air-cooling chamber B. The air to be cooled enters the chamber at $b'$, passes down through the chamber, and leaves it at $b$, its course being indicated by the unfeathered arrows. By means of a pump, $k$, a liquid or gaseous refrigerant is forced upward through the coolers $k'$ $k^2$ $k^3$ $k^4$ to the top thereof. The refrigerant passes thence into a return-pipe, $k^5$, which returns the refrigerant back to the pump $k$; but before reaching the pump the refrigerant is recooled, and for this purpose the pipe $k^5$ may be suitably enlarged or shaped—as, for instance, into the coil $k^6$, and have cold applied thereto, as by means of a cold fluid circulating through a tank, $k^7$, in which the coil $k^6$ is held, the cooling-fluid entering and leaving the tank at $k^8$ and $k^9$, respectively.

If desired, the pump, tank, and coil may be located without the chamber B.

When a liquid refrigerant is used the coolers $k'$ $k^2$ $k^3$ $k^4$ may be open at top.

The coolers extend upward throughout the air-cooling chamber, and they may be of any shape suitable for cooling the air which descends around them.

The advantages of this mode and apparatus for cooling the air are as follows: The movement of the refrigerant is in the opposite direction to that of the air being cooled. The coldest portions of the coolers are thus in the coldest stratum of air in the air-cooling chamber, and the warmest portions of the coolers in the warmest air, and thus the movement of the refrigerant can be regulated so as to have the temperature of the coolers throughout their height accord with that of the surrounding descending air, and the refrigerant be thoroughly economized; also, by connecting the top and bottom of the coolers through the pipe $k^5$, and causing the refrigerant to circulate around and round, as described, the movement of the refrigerant, when a liquid, is greatly facilitated. For the liquid column in the pipe $k^5$, balancing the column in the coolers $k'$ $k^2$ $k^3$ $k^4$, much less force is required for keeping the liquid in motion than when the pipe $k^5$ is not used and the refrigerant is discharged from the top of the cooling apparatus.

I claim—

1. In a refrigerator or refrigerating-house, the combination of an air-cooling chamber and a refrigerating-apartment, the latter surrounding the former, the inlet from the air-cooling chamber into the refrigerating-apartment being at or near the bottom of the latter, and the outlet from the refrigerating-apartment being at or near the top thereof.

2. In a refrigerator or refrigerating-house, the combination of an air-cooling chamber and a refrigerating-apartment, said chamber and apartment being arranged side by side, and opening into each other exclusively at their ends.

3. The combination of an air-cooling chamber and a refrigerating-apartment, the latter winding spirally around the former.

4. The combination of the chamber B and the series A A' A², arranged and connected, and said chamber B extending horizontally alongside said series, substantially as described.

5. The combination of the apartment A and the central air-cooling chamber, B, the said apartment being divided into compartments $a\ a\ a\ a$, and the air-inlets into the refrigerating-compartments being at or near the bottoms thereof, and the air-outlets from the refrigerating-compartments being at or near the tops thereof, substantially as described.

6. The combination of the compartments $a\ a\ a\ a$, central chamber, B, doors $c\ c\ c\ c$, and flues D D D D, substantially as described.

7. The herein-described mode of chilling articles, which consists in moving them, while being chilled, through the chilling-room in a direction contrary to that of the refrigerating air-current, for the purpose set forth.

8. The combination of the apartment A, having the opening $b$ for the admission, and the opening $b'$ for the discharge, of the air, and the means, substantially as described, for moving the articles to be refrigerated in a direction contrary to that of the refrigerating air-current.

9. The combination of the apartment A, having the doors I I and openings $b\ b'$, and the ways F, chain G, and tackle G', substantially as described.

10. The air-cooling chamber B, having the refrigerating apparatus K, said apparatus extending upward and downward in said chamber, and having a liquid or gaseous refrigerant flowing upward through it, and thence back through the returning-pipe $k^5$, said return-pipe $k^5$ being without the air-cooling chamber, substantially as described.

11. The combination of the chamber B, the pump $k$, coolers $k'\ k^2\ k^3\ k^4$, return-pipe $k^5$, coil $k^6$, tank $k^7$, and pipes $k^8\ k^9$, said return-pipe $k^5$ being without the air-cooling chamber, substantially as described.

Witness my hand.

D. W. C. SANFORD.

Witnesses:
 G. H. LOKER, Jr.,
 CHAS. D. MOODY.